Oct. 28, 1952     O. R. ROWE ET AL     2,615,707
CUSHIONING MEANS

Filed Oct. 13, 1948     3 Sheets-Sheet 1

Inventors
OLIVER R. ROWE
WILLIAM J. STOLP

Parrott and Richards
Attorneys

Oct. 28, 1952 O. R. ROWE ET AL 2,615,707
CUSHIONING MEANS
Filed Oct. 13, 1948 3 Sheets-Sheet 2
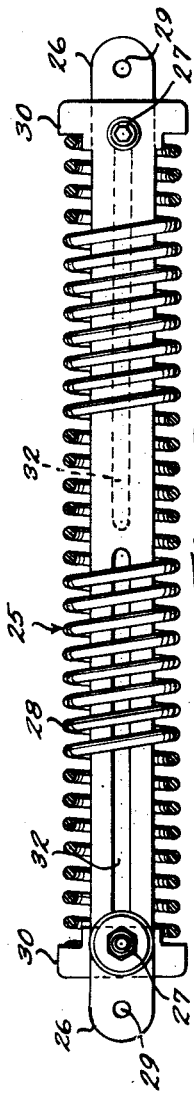
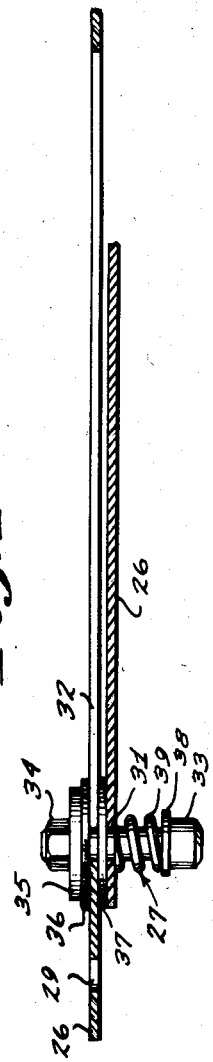
Inventors
OLIVER R. ROWE
WILLIAM J. STOLP
By Parrott and Richards
Attorneys Patented Oct. 28, 1952

2,615,707

UNITED STATES PATENT OFFICE 2,615,707

CUSHIONING MEANS

Oliver R. Rowe and William J. Stolp, Charlotte, N. C., assignors to R. H. Bouligny, Inc., a corporation of North Carolina Application October 13, 1948, Serial No. 54,348

5 Claims. (Cl. 267—1)

This invention relates to cushioning means adapted for absorbing shock, and more particularly to means of this sort by which the energy of the shock can be absorbed in a manner such as to keep the shock force on the object cushioned within prescribed limits and the deflection of the object to a minimum.

A principal field of application of the present invention is for cushioning equipment, such as delicate optical or measuring instruments and the like, to protect the equipment against damage during shipment or storage. The cushioning means of the present invention is also adapted for use as a machine element for providing shock absorbing action.

The invention is illustrated in the accompanying drawing in which:

Fig. 3 is an enlarged detail of the cushioning means shown in Figs. 1 and 2;

Fig. 4 is a corresponding detail showing the cushioning means extended as under load;

Fig. 5 is a fragmentary detail, partly in section, of the arrangement of the friction means.

Figure 1:
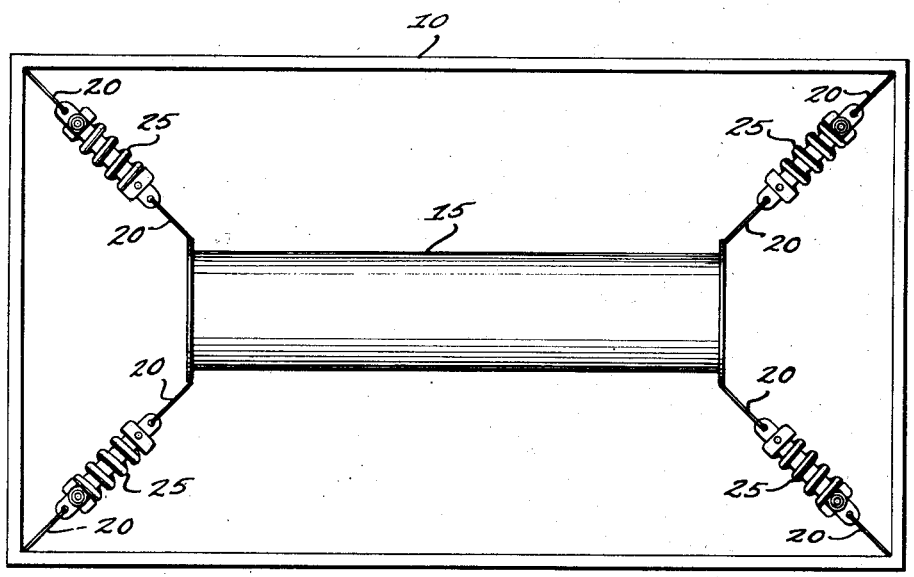
Fig. 1 is a side view of a packaging means for protecting an object against shock and illustrating the manner in which the cushioning means of the present invention may be incorporated in such a package.
Figure 2:
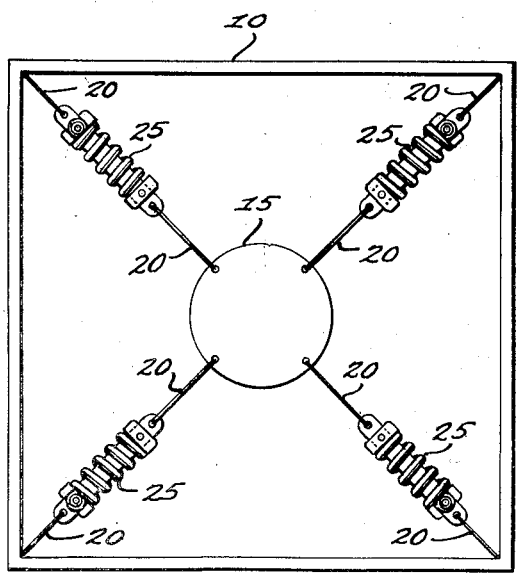
Fig. 2 is a corresponding end view of the packaging means shown in Fig. 1.

The packaging means shown in Figs. 1 and 2 may comprise any suitable cage structure 10 for suspending the object to be protected from shock in a suitable container as at 15. The cage structure 10 illustrated in the drawing is conveniently formed of angle iron, and may be fitted with covering material (not shown) if desired. The container 15 may be adapted as necessary for packaging the object to be protected, and the cage structure 10 is proportioned in relation to the container 15 to allow adequate displacement of the container 15 under shock loading as pointed out further below.

The container 15 is suspended from the cage structure 10 by cables or chains 20 or the like carrying cushioning means 25 arranged in accordance with the present invention. The suspension cables 20 and cushioning means 25 may be arranged in any pattern desired with respect to the container 15 although it will usually work to the best advantage to have the cushioning means 25 disposed at an angle of 45° with respect to the container 15, and to space the cushioning means 25 so that they support the container 15 as nearly as possible in equal numbers in all directions.

The details of the cushioning means 25 of the present invention are shown in Figs. 3, 4, and 5 of the drawing. Briefly described, this cushioning means 25 comprises shock receiving members 26 assembled for relative displacement under shock load, friction means disposed at the points of assembly as indicated generally by the reference numeral 27 for imposing a friction drag on displacement of the shock receiving members 26, and preloaded spring means 28 associated with the assembled shock receiving member 26 for resisting their displacement.

In the embodiment shown in the drawing, the shock receiving members 26 consist of drawbars or tension members adapted for transmitting a tension load to a compression spring. Each shock receiving member or drawbar 26 is of identical form, having a load receiving end in which an aperture 29 or similar means is provided for engaging the cables 20 or other securing means, and being formed with a shouldered portion 30 adjacent their other ends. The drawbars 26 are assembled in inverted relation with respect to each other, each drawbar 26 having an assembly aperture 31 adjacent its shouldered portion, and an elongated assembly slot 32 extending from adjacent its other end by which relative sliding movement of the assembled drawbars 26 is accommodated.

As previously mentioned, the drawbars 26 are assembled by means as at 27 incorporating friction means for imposing a friction drag on sliding movement of the assembled drawbars 26. This assembly means suitably comprises a bolt 33 extending through the assembly aperture 31 of one drawbar 26 and the elongated assembly slot 32 of the other to engage a nut 34, an assembly means of this sort being provided at each end of the assembly as shown in the drawing. The bolt 33 carries a washer 35 beneath the nut 34 to bear on a friction disk 36 disposed against the adjacent face of one of the drawbars 26, and a similar friction disk 37 is disposed over the bolt 33 between the drawbars 26. A washer 38 is also carried on the bolt 33 against the shoulder provided by its head to contain a spring 39 against the adjacent drawbar 26. By this arrangement the friction drag imposed on sliding movement of the drawbars 26 can be easily adjusted initially and during use as desired. It should also be noted, however, that a riveted or other permanently fixed assembly means might be used whenever this adjustment feature is not desired. Further, the friction drag might be imposed at some point other than the assembly points for the cushioning means as by bowing the drawbars 26 for friction contact, but in the usual case the arrangement illustrated and described above will be found more satisfactory.

The spring means 28 as shown in the drawing comprises a compression spring which is preloaded and disposed on the assembled drawbars 26 between the shouldered portions 30. It will be apparent that the spring means 28 might alternatively be a tension spring preloaded on shock receiving members arranged to receive the shock loading in compression, if desired.

In assembling the cushioning means 25 according to the present invention, the friction means 27 is preferably adjusted or set so that it imposes a friction drag substantially equal to, although not greater than, the preloading of the spring means 28, which allows automatic recovery of the cushioning means 25 after shock loading, but which also results in dissipation during recovery of a major portion of the shock energy absorbed by the spring means 28, thus providing a dampening action that avoids any cyclic vibration of the cushioning means 25 such as might occur if a free spring were used. The friction means 27 may, if desired, be adjusted or set to impose any lesser friction drag, but this will require a proportionate increase in the preloading of the spring means 28, which will not only result in reducing the dampening action provided but will also require a longer spring, and thus will not usually be advantageous.

Also, in accordance with the present invention, the preloaded spring means 28 is arranged and associated with the drawbars 26 so that it has a remaining deflection sufficient when supplemented by the drag imposed by the friction means 27 for absorbing a given shock load at a rate such that the object cushioned is not subjected to a shock force in excess of a predetermined maximum limit. The arrangement of the friction means 27 and the spring means 28 in this respect may be illustrated by reference to the diagram shown in Fig. 6 of the drawing.

It is a common specification where delicate equipment must be protected during shipment or storage, or in machine design where provision must be made for absorbing shock, that the object or machine element to be protected or cushioned shall not be subjected to a shock load in excess of a predetermined maximum limit. Commonly this maximum limit is expressed as a G load value, meaning that the object shall not be subjected to a shock force exceeding a given multiple of gravity, or its own weight. Thus, a maximum limit of 10G would require that the object cushioned not be subjected to a shock load in excess of ten times its own weight.

Figure 6:
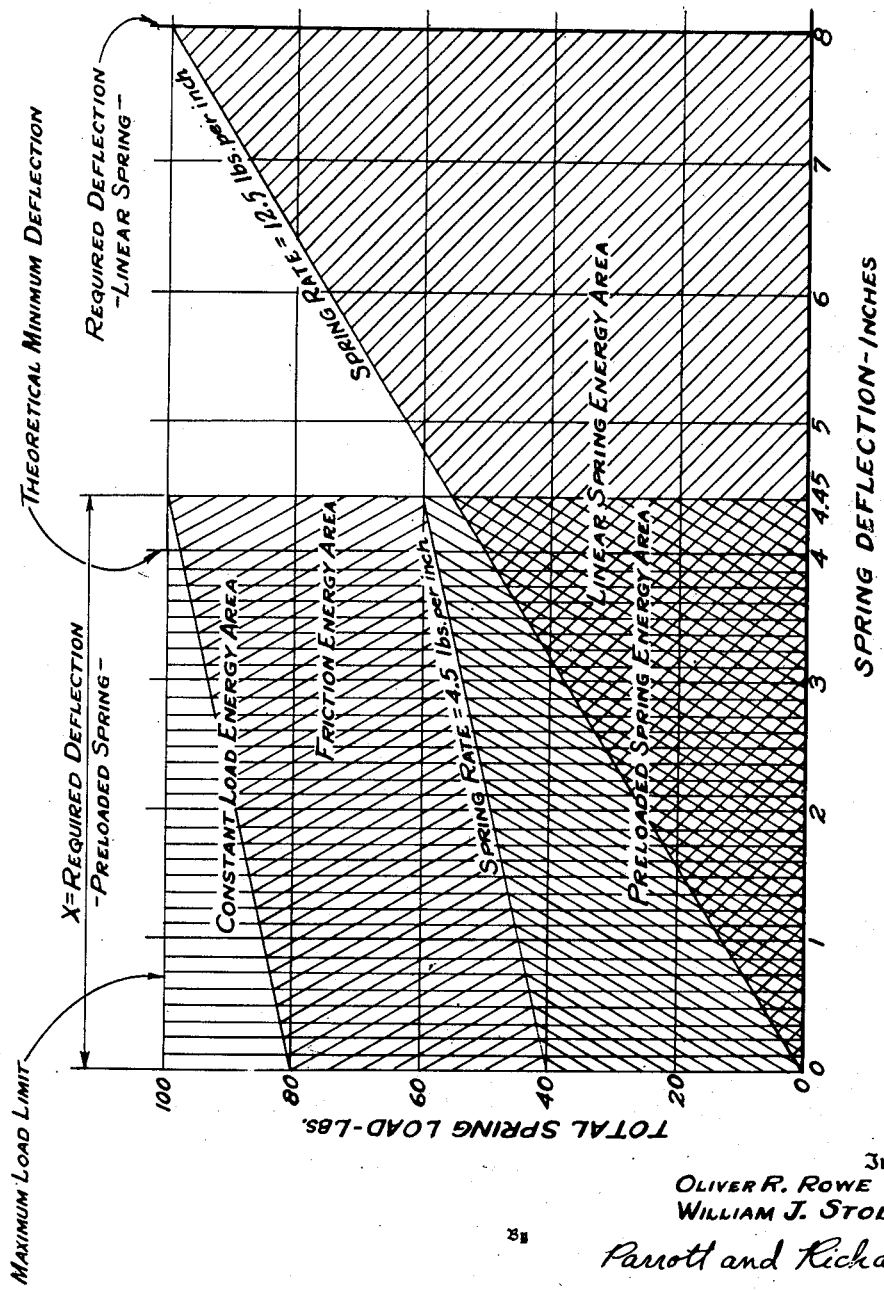
Fig. 6 is a diagram illustrating the shock absorbing characteristics of the cushioning means of the present invention.

Now let it be supposed, for example, that a delicate object weighing 10 pounds is required to be protected during shipment or storage from a shock force in excess of 10G (or 100 pounds) when dropped from a height of 40 inches. The kinetic energy developed by a 10 pound object falling 40 inches is 400 inch pounds. This kinetic energy must be absorbed by the cushioning means, according to the above stated requirements, in a manner such that the shock force, i. e., the force cushioning or resisting the falling object, does not exceed 100 pounds (10G). Obviously, this requirement would be satisfied to the best advantage by applying a constant resisting or cushioning force of 100 pounds to the falling object. If this were possible, the above noted 400 inch pounds of kinetic energy could be absorbed in a deflection of 4 inches (400 inch pounds/100 pounds), which is the theoretical minimum deflection for the conditions stated above. The energy absorption of such a system is represented in Fig. 6 of the drawing by the vertically lined area labeled "Constant Load Energy Area."

It is well known, however, that spring action does not provide a constant resisting force, but that springs have a characteristic rate by which their resisting force increases with deflection. A free, linear spring, for example, has no load absorption properties until deflected, and when deflected absorbs load according to a linearly increasing function. Thus, it would require a free, linear spring having a spring rate of 12.5 pounds/inch to absorb the above required 400 inch pounds of kinetic energy without exerting a resisting or cushioning force in excess of 100 pounds (10G). The energy absorption with a spring of this type is represented by the area under the curve for a spring rate of 12.5 pounds/inch which is labeled "Linear Spring Energy Area." The significant point to note is that the free, linear spring requires 8 inches of deflection to absorb the required amount of energy, which is twice the theoretical minimum deflection that would be necessary if a constant resisting force could be applied.

On the other hand, if the spring is initially preloaded and combined with a friction means in accordance with the present invention, constant load absorption properties can be approached very closely, and with a considerably lower spring rate. Assume, for example, that in the present instance being considered, the cushioning means is adapted for a preloading of 80 pounds, which as noted above would be imposed in substantially equal parts by adjustment of the friction means 27 and initial compression of the spring means 28 before assembly. Then the spring deflection ($X$) required for absorbing 400 inch pounds of energy would be:

$$(80)(X) + \tfrac{1}{2}(100-80)(X) = 400$$

or $$X = 4.45 \text{ inches}$$

and the corresponding spring rate would be:

$$(60-40)/4.45 = 4.5 \text{ pounds/inch}$$

as indicated in Fig. 6 of the drawing in which the area under the curve for a spring rate of 4.5 pounds/inch is labeled "Preloaded Spring Energy Area," and is shown with a supplementary area labeled "Friction Energy Area," representing the energy absorption equivalent to 400 inch pounds of a preloaded spring means 28 combined with a friction means 27 adjusted to impose a friction drag equal to the preloading of the spring.

Evidently then a cushioning means 25 may be arranged according to the present invention with shock absorption properties approaching very closely the properties theoretically possible at constant load absorption, which not only reduces substantially the spring rate required, but also provides a marked reduction in the spring deflection necessary. The necessary spring deflection is a particularly important factor because it determines the size required for the cage structure 10. That is, when a smaller spring deflection is possible, a smaller cage structure 10 may be used with resulting economies in shipping or storage space. Also, it will be apparent that the same factor would effect the space or clearance requirements in machine design problems generally.

It will be understood that, while the shock absorption characteristics illustrated in Fig. 6 of the drawing are entirely representative and feasible according to the present invention, it may be advantageous or desirable to vary these characteristics in a particular instance to employ a spring available with a given spring rate or for other similar reasons, but that the shock absorption properties would still be determined according to the present invention in the same manner as illustrated in Fig. 6, and that all such variations are within the scope of the present invention and are contemplated by the appended claims.

We claim:

1. A cushioning means comprising shock receiving members assembled for relative sliding displacement under tension shock load, clamping means assembled with said shock receiving members and slidably gripping said members for imposing a friction drag on said sliding displacement, and preloaded spring means assembled with said shock receiving members for resisting said sliding displacement, the friction drag imposed by said clamping means being less than the preloading of said spring means, and said spring preloading and friction drag exerting an aggregate cushioning force sufficient to absorb a given shock load in a minimal displacement without subjecting the object cushioned to a shock force in excess of a predetermined maximum limit.

2. A cushioning means comprising shock receiving members assembled for relative sliding displacement under tension shock load, clamping means assembled with said shock receiving members and slidably gripping said members for imposing a friction drag on said sliding displacement, and preloaded spring means assembled with said shock receiving members for resisting said sliding displacement, said clamping means being arranged for imposing a friction drag substantially equal to but not greater than the preloading of said spring means, whereby automatic recovery of said cushioning means is allowed but a major portion of the shock load absorbed by said spring means is dissipated during recovery, and said preloaded spring means being assembled with said shock receiving members for a remaining deflection sufficient when supplemented by the drag imposed by said clamping means for absorbing a given shock load at a rate such that the object cushioned is not subjected to a shock force in excess of a predetermined maximum limit.

3. A cushioning means comprising tension members assembled for relative sliding movement under tension shock loading, clamping means slidably gripping said assembled tension members for imposing a friction drag on said sliding movement, and preloaded compression spring means associated with said assembled tension members for resisting said sliding movement, said clamping means being arranged for imposing a friction drag substantially equal to but not greater than the preloading of said spring means, whereby automatic recovery of said cushioning means is allowed but a major portion of the shock load absorbed by said spring means is dissipated during recovery, and said preloaded spring means being associated with said tension members for a remaining deflection sufficient when supplemented by the drag imposed by said clamping means for absorbing a given shock load at a rate such that the object cushioned is not subjected to a shock force in excess of a predetermined maximum limit.

4. A cushioning means comprising a pair of drawbars assembled in inverted relation with respect to each other for relative sliding movement under tension shock load, each of said drawbars being formed with a load receiving end and being formed with a shouldered portion adjacent their other ends, clamping means slidably connecting said drawbars adjacent the shouldered portion of each draw bar for imposing a friction drag on said sliding movement, and preloaded compression spring means disposed on said assembled drawbars between said shouldered portions for resisting said sliding movement, said clamping means being arranged for imposing a friction drag substantially equal to but not greater than the preloading of said spring means, whereby automatic recovery of said cushioning means is allowed but a major portion of the shock load absorbed by said spring means is dissipated during recovery, and said preloaded spring means being disposed on said drawbars for a remaining deflection sufficient when supplemented by the drag imposed by said clamping means for absorbing a given shock load at a rate such that the object cushioned is not subjected to a shock force in excess of a predetermined maximum limit.

5. A cushioning means for absorbing shock comprising a pair of drawbars assembled in inverted relation with respect to each other for relative sliding movement under tension loading, each of said drawbars being formed with an extending end portion at which said cushioning means may be coupled for suspending an object to be cushioned against shock, and each of said drawbars being formed with a shouldered portion at their other ends, clamping means carried by each drawbar adjacent said shouldered portion for slidably engaging the other drawbar, each of said clamping means being adapted for slidably gripping said other drawbar and thereby imposing a friction drag on sliding movement of the assembled drawbars, and a preloaded compression spring disposed on said assembled drawbars between said shouldered portions for opposing sliding movement of said drawbars under tension loading, said clamping means being arranged for imposing a friction drag substantially equal to but not greater than the preloading of said spring, whereby automatic recovery of said cushioning means is allowed after release from tension loading but a major portion of the energy absorbed by said spring during said tension loading is dissipated during said recovery, and said preloaded spring means being disposed on said drawbars for a remaining deflection under tension loading that is sufficient when supplemented by the drag imposed by said clamping means for absorbing a given shock load during tension loading at a rate such that the object cushioned is not subjected to a shock force in excess of a predetermined maximum limit.

OLIVER R. ROWE.
WILLIAM J. STOLP.

REFERENCES CITED

The following references are of record in the file of this patent:

UNITED STATES PATENTS

| Number | Name | Date |
|---|---|---|
| 347,812 | Lauth | Aug. 24, 1886 |
| 1,609,353 | Heflin | Dec. 7, 1926 |
| 1,884,981 | Otto | Oct. 25, 1932 |
| 2,035,066 | Havas | Mar. 24, 1936 |
| 2,396,774 | Dath | Mar. 19, 1946 |
| 2,400,504 | Haseltine | May 21, 1946 |
| 2,439,937 | Krob | Apr. 20, 1948 |

FOREIGN PATENTS

| Number | Country | Date |
|---|---|---|
| 24,743 of 1913 | Great Britain | Nov. 2, 1914 |
| 359,242 | Great Britain | Oct. 22, 1931 |